(12) United States Patent
Visotsky et al.

(10) Patent No.: US 6,175,588 B1
(45) Date of Patent: Jan. 16, 2001

(54) COMMUNICATION DEVICE AND METHOD FOR INTERFERENCE SUPPRESSION USING ADAPTIVE EQUALIZATION IN A SPREAD SPECTRUM COMMUNICATION SYSTEM

(75) Inventors: Yevgeny Visotsky, Skokie; Colin D. Frank, Chicago; Upamanyu Madhow, Urbana; Rahul Singh, Arlington Heights, all of IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/001,248

(22) Filed: Dec. 30, 1997

(51) Int. Cl.[7] .................................................. H04B 15/00
(52) U.S. Cl. ............................................ 375/148; 375/232
(58) Field of Search ..................................... 375/130, 147, 375/232, 324, 148, 346

(56) References Cited

U.S. PATENT DOCUMENTS

| | | | |
|---|---|---|---|
| 4,829,543 | 5/1989 | Borth et al. | 375/83 |
| 5,105,435 | 4/1992 | Stilwell | 375/1 |
| 5,136,612 | 8/1992 | Bi | 375/1 |
| 5,267,261 | 11/1993 | Blakeney, II et al. | 375/1 |
| 5,377,226 | 12/1994 | Davis | 375/1 |
| 5,383,220 | 1/1995 | Murai | 375/1 |
| 5,396,516 | 3/1995 | Padovani et al. | 375/225 |
| 5,463,657 | 10/1995 | Rice | 375/200 |
| 5,550,810 | 8/1996 | Monogioudis | 370/18 |
| 5,553,062 | 9/1996 | Schilling et al. | 370/18 |
| 5,572,552 | 11/1996 | Dent et al. | 375/343 |
| 5,610,554 | 3/1997 | Anvari | 330/52 |
| 5,621,752 | 4/1997 | Antonio et al. | 375/200 |
| 5,671,255 | 9/1997 | Wang et al. | 375/341 |
| 5,677,930 | 10/1997 | Bottomly | 375/208 |
| 5,692,006 | * 11/1997 | Ross | 375/130 |
| 5,717,717 | * 2/1998 | Yang et al. | 375/232 |
| 5,978,413 | * 11/1999 | Bender | 375/206 |
| 5,982,825 | * 11/1999 | Tsujimoto | 375/347 |

FOREIGN PATENT DOCUMENTS

| | | |
|---|---|---|
| 0 526 439 A1 | 2/1993 | (EP) . |
| 0 641 102 A2 | 3/1995 | (EP) . |
| WO 95/09493 A1 | 4/1995 | (WO) . |
| WO 96/37054 A1 | 11/1996 | (WO) . |
| WO97/08846 | 3/1997 | (WO) . |
| WO97/08848 | 3/1997 | (WO) . |

OTHER PUBLICATIONS

J. Tijdhof et al., "On the Design and Realization of Adaptive Equalization for Mobile Communicatin", *First Signal Processing Adv. in Wireless Communications*, IEEE, Paris, France, Apr. 16–18, 1997, pp. 381–4.

Bernasconi et al., "Design and experimental characterization of a rake receiver for a mobile station of a DS–CDMA system", 1996, pp. 154–8.

\* cited by examiner

*Primary Examiner*—Temesghen Ghebretinsae
(74) *Attorney, Agent, or Firm*—John G. Rauch; Paul J. Bartusiak

(57) ABSTRACT

A communication device such as a mobile station (410) for a spread spectrum communication system includes a receiver (100) having an adaptive equalizer (104) which suppresses interference on a received spread spectrum signal to produce an equalized signal (126). A pilot channel demodulator (110) demodulates the equalized signal to produce an estimate of the pilot channel (140). A summer (112) compares the pilot channel estimate and a predetermined data pattern to produce an error signal (124). A traffic channel demodulator (108) demodulates the equalized signal to produce one or more traffic channels.

33 Claims, 6 Drawing Sheets

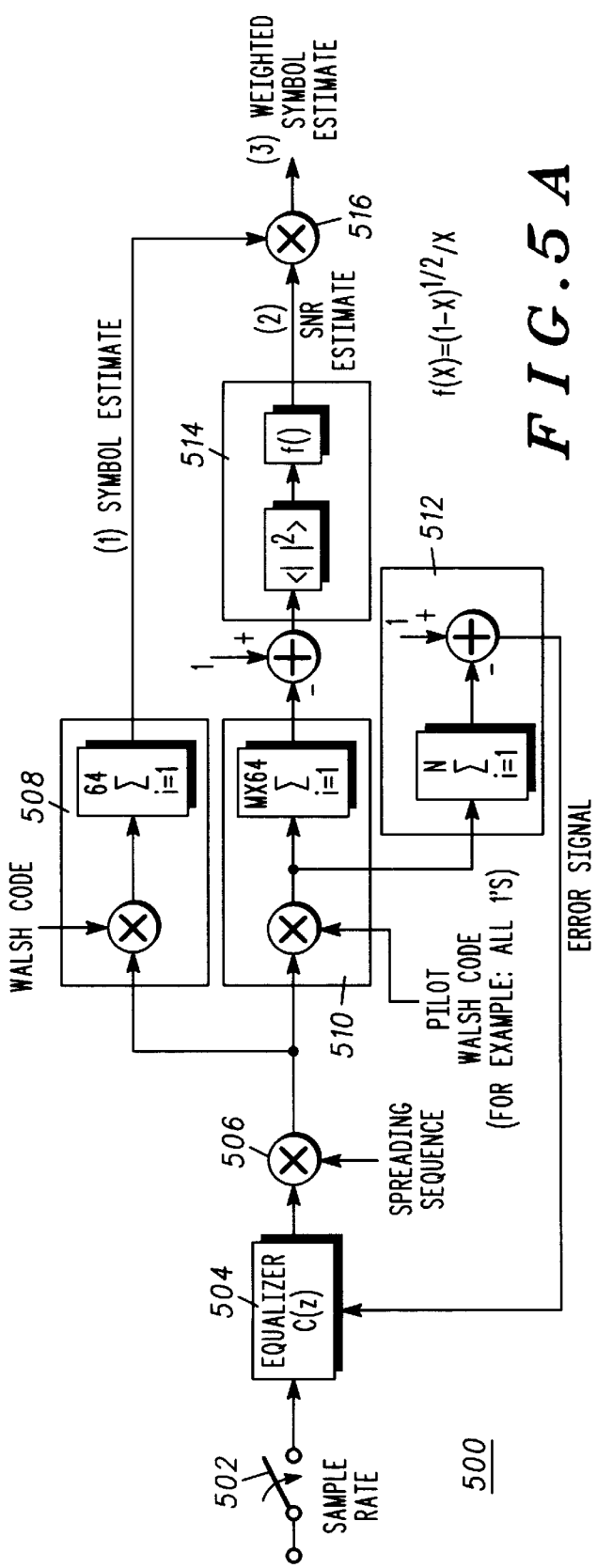

US 6,175,588 B1

COMMUNICATION DEVICE AND METHOD FOR INTERFERENCE SUPPRESSION USING ADAPTIVE EQUALIZATION IN A SPREAD SPECTRUM COMMUNICATION SYSTEM

FIELD OF THE INVENTION

The present invention generally relates to communication systems. More particularly, the present invention relates to a communication device and method for interference suppression using adaptive equalization in a spread spectrum communication system.

BACKGROUND OF THE INVENTION

In a spread spectrum communication system, downlink transmissions from a base station to a mobile station include a pilot channel and a plurality of traffic channels. The pilot channel is decoded by all users. Each traffic channel is intended for decoding by a single user. Therefore, each traffic channel is encoded using a code known by both the base station and mobile station. The pilot channel is encoded using a code known by the base station and all mobile stations. Encoding the pilot and traffic channels spreads the spectrum of transmissions in the system.

One example of a spread spectrum communication system is a cellular radiotelephone system according to Telecommunications Industry Association/Electronic Industry Association (TIA/EIA) Interim Standard IS-95, "Mobile Station-Base Station Compatibility Standard for Dual-Mode Wideband Spread Spectrum Cellular System"("IS-95"). Individual users in the system use the same frequency but are distinguishable from each other through the use of individual spreading codes. Other spread spectrum systems include radiotelephone systems operating at 1900 MHz, commonly referred to as DCS1900. Other radio and radiotelephone systems use spread spectrum techniques as well.

IS-95 is an example of a direct sequence code division multiple access (DS-CDMA) communication system. In a DS-CDMA system, transmissions are spread by a pseudorandom noise (PN) code. Data is spread by chips, where the chip is the spread spectrum minimal-duration keying element.

Mobile stations for use in spread spectrum communication systems have employed RAKE receivers. A RAKE receiver is a form of matched filter receiver which includes two or more receiver fingers which independently receive radio frequency (RF) signals. Each finger estimates channel gain and phase and demodulates the RF signals to produce traffic symbols. The traffic symbols of the receiver fingers are combined in a symbol combiner to produce a received signal.

A RAKE receiver is used in spread spectrum communication systems to combine multipath rays and thereby exploit channel diversity. Multipath rays include line of sight rays received directly from the transmitter and rays reflected from objects and terrain. The multipath rays received at the receiver are separated in time. The time separation or time difference is typically on the order of several chip times. By combining the separate RAKE finger outputs, the RAKE receiver achieves path diversity.

Generally, the RAKE receiver fingers are assigned to the strongest set of multipath rays. That is, the receiver locates local maxima of the received signal. A first finger is assigned to receive the strongest signal, a second finger is assigned to receive the next strongest signal, and so on. As received signal strength changes, due to fading and other causes, the finger assignments are changed. After finger assignment, the time locations of the maxima change slowly, and these locations are tracked by time tracking circuits in each assigned finger.

One limitation on the performance of a DS-CDMA receiver is multiple-access interference or noise at the receiver. Generally, there are two sources of multiple-access interference on the forward link, from base station to the subscriber unit. The first source is multipath originating from the same base station or the same sector of the same base station as the received signal of interest. The multiple traffic signals transmitted from the base station are orthogonal at the base station's transmitter, because the covering Walsh codes are orthogonal. In the RAKE receiver, interference from orthogonal received traffic signals is completely suppressed. However, multipath in the channel between the base station and the receiver destroys the orthogonality of the Walsh codes by introducing time delay. As a result, some multiple-access interference is introduced.

The second source of multiple-access interference is interference from other sectors, both those sectors in soft-handoff with the subscriber unit and those not in soft-handoff with the subscriber unit. The signals transmitted from neighboring sectors are not orthogonal, regardless of the channel, so some multiple-access interference is introduced at the receiver. Under these conditions, the RAKE receiver performance is limited by multiple access interference.

Accordingly, there is a need in the art for an improved interference suppression technique for DS-CDMA systems.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

FIG. 5A shows a block diagram of a receiver in accordance with the present invention;

FIG. 5B shows a Viterbi decoder 520 which may be used in conjunction with the receiver of FIG. 5A;

FIG. 5C shows a decoder which may be used in conjunction with the receiver 500 of FIG. 5A;

DETAILED DESCRIPTION OF A PREFERRED EMBODIMENT

Figure 1:
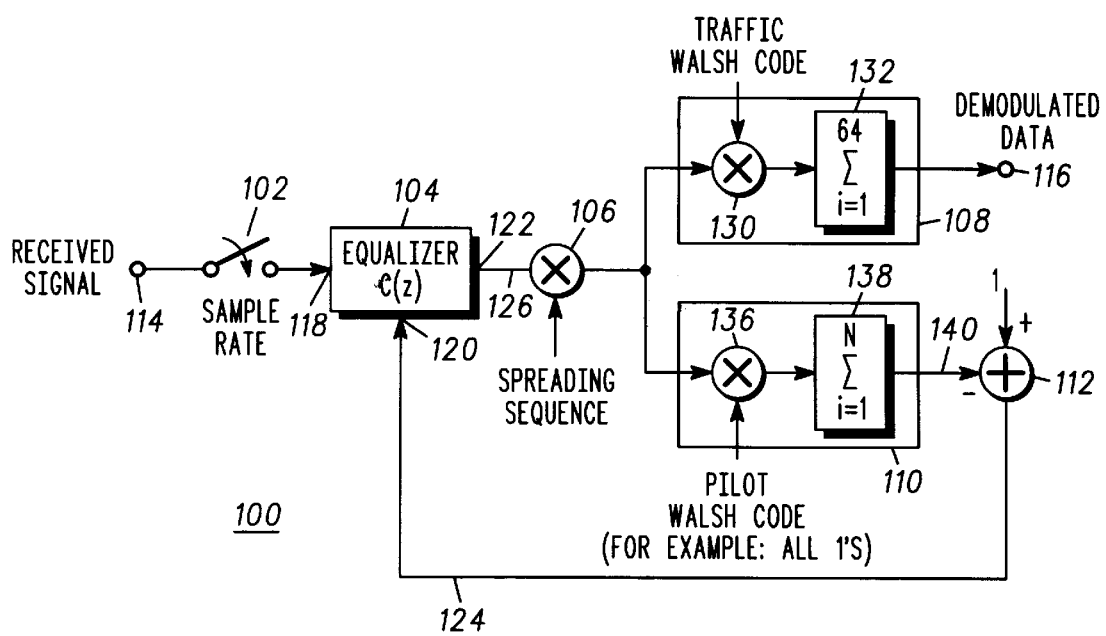
FIG. 1 is a block diagram of a first embodiment of a receiver in accordance with the present invention.

Referring now to FIG. 1, a receiver 100 includes a sampler 102, an adaptive equalizer 104, a despreader 106, a traffic channel demodulator 108, a pilot channel demodulator 110, and a summer 112. The receiver 100 receives spread spectrum signals at an input 114 and produces demodulated traffic channel at an output 116. In the illustrated embodiment, the receiver 100 is suitable for use in a DS-CDMA communication system according to Telecommunications Industry Association/Electronic Industry Association (TIA/EIA) Interim Standard IS-95, "Mobile Station-Base Station Compatibility Standard for Dual-Mode Wideband Spread Spectrum Cellular System"("IS-95"). Such a system includes a plurality of base stations each of which provides radiotelephone service to a particular geographic area for mobile stations in that area. In particular, the receiver 100 is well-suited to receiving the IS-95 downlink, from a remote base station to a mobile station. However, the receiver is usable with any suitable spread spectrum system.

The spread spectrum signals received at the input 114 generally contain a plurality of channels. In an IS-95 system, these channels include a pilot channel or pilot signal, a paging channel and a plurality of traffic channels or traffic signals. The pilot channel forms a control channel. It is used for system acquisition and does not contain traffic data. The plurality of channels are all substantially orthogonal, meaning the cross-correlation of any two channels is substantially zero. For example, in an IS-95 system, the downlink consists of up to 64 logical channels (code channels). The channels are independent in that they carry different data streams. The code channels are covered by one of a set of 64 Walsh codes or Hadamard codes. The pilot channel is covered by Walsh (0) and the traffic channels are covered by Walsh codes known to the receiver 100. Because the Walsh codes are orthogonal, the channels as transmitted are orthogonal.

The sampler 102 converts the received spread spectrum signal to a discrete time signal at the sample rate. In the illustrated embodiment, the sample rate is typically at least two times the chip rate, which for an IS-95 system is 1.2288 Mega-chips per second, equivalent to a chip time of about 0.814 $\mu$sec/chip. The chip rate is faster than the symbol rate. In IS-95, there are 64 chips/symbol. The sample rate may alternatively be four times the chip rate, eight times the chip rate or even higher.

The adaptive equalizer 104 has an input 118 for receiving the spread spectrum signal and an input 120 for receiving an error signal 124. The adaptive equalizer suppresses interference on the spread spectrum signal to produce an equalized signal 126 at an output 122. The adaptive equalizer 104 is defined by the equation $$C(z) = \sum_{m=-L}^{L} C m Z^{-m},$$

where $c_m$, $-L \leq m \leq L$ are the n coefficients of the equalizer. The adaptive equalizer 104 may be realized as a finite transversal filter or in any other suitable structure. The adaptive equalizer 104 adapts the coefficients of the filter to minimize the mean-square error due to noise, interference and intersymbol interference at the output 122. The adaptation of the adaptive equalizer 104 is driven by the error signal 124 which indicates to the equalizer the direction that the coefficients should be moved to more accurately represent the data at the output 122. In accordance with the present invention, the adaptive equalizer 104 adapts using a pilot channel received by the receiver 100 and produces an equalized signal.

The despreader 106 is coupled to the adaptive equalizer and despreads the equalized signal 126 in response to a predetermined spreading sequence. The spreading sequence is shared by the transmitter, such as a base station in a cellular communication system, and the receiver.

The traffic channel demodulator 108 demodulates the equalized signal 126 to produce one or more traffic channels. The traffic channel demodulator 108 includes a despreader 130 and a summer 132. The despreader 130 despreads the equalized signal by applying the appropriate Walsh code. The Walsh code is specified by the communication system in which the receiver 100 operates. Each traffic channel is uniquely assigned a Walsh code and identity of the appropriate Walsh code is communicated to the receiver 100 so that the receiver can demodulate its assigned traffic channel. The summer 132 sums chips over a predetermined interval, such as 64 chips, to produce a demodulated data symbol at the output 116.

The pilot channel demodulator 110 operates similarly to the traffic channel demodulator 108. The pilot channel demodulator 110 demodulates the equalized signal to produce a pilot channel estimate. The pilot channel demodulator 110 includes a despreader 136 and a summer 138. The despreader 136 applies the pilot channel Walsh code to despread the equalized signal. As indicated in FIG. 1, in IS-95, the pilot channel Walsh code consists of all +1 data values, corresponding to Walsh(0). The despread chips are summed in the summer 138 over a predetermined interval, such as 64 chips to produce an estimated pilot signal 140. As will be described below, the summer may sum any integral number of chips so that the adaptive equalizer may be adapted at any integral multiple of the chip rate.

The summer 112 combines the estimated pilot signal 140 and a predetermined data pattern to form the error signal 124. Preferably, the predetermined data sequence is the same data sequence as that which forms the pilot channel. In the illustrated embodiment, this is a pattern of all +1 values. The summer 112 sums the +1 values and the negative of the estimated pilot signal to form the error signal 124. If the estimated pilot signal matches the predetermined data pattern, the error signal is zero valued, and no adjustment or adaptation is made at the adaptive equalizer 104. In place of the summer 112, a comparator or other logic device may be used. The summer 112 forms an error signal generator for producing the error signal in response to the pilot channel estimate.

As noted above, the IS-95 forward channel or downlink uses orthogonal codes to separate the forward link pilot, paging and traffic channels. A consequence of the use of orthogonal Walsh codes on the forward link is that equalization may yield significant noise suppression benefits, even at low chip signal to noise ratio (SNR). Noise suppression improvement depends on the channel and on $I_{oc}/I_{or}$, which is the ratio of other-cell interference to intra-cell interference, but does not depend on $E_c/I_{or}$, which is the ratio of chip energy to intra-cell interference. Because Walsh codes transmitted from the desired base station or sector are orthogonal, no intra-cell multiple access interference will be observed at the receiver if the channel has no multipath. For a channel with multipath, intra-cell multiple access interference can be completely removed by inverting the channel with a zero forcing equalizer. In situations in which intra-cell interference dominates other-cell interference and additive white Gaussian noise (AWGN), link performance can be improved by several dB, depending on the channel.

Inverting the channel may enhance additive noise which is the sum of other-cell interference and background AWGN. An equalizer minimizing a minimum mean square error (MMSE) criterion is used by the receiver 100 to optimally weigh the benefit of reduced intra-cell interference against the cost of increased noise due to both the other-cell interference and AWGN.

Other-cell interference which has been filtered by a multipath channel appears at the subscriber unit as non-white noise. If the other-cell interference dominates intra-cell interference, the MMSE equalizer will suppress the other-cell interference (by whitening it) and can improve performance by several dB.

If neither intra-cell nor other-cell interference is dominant, the optimal equalizer depends on both the propagation channels between the desired and interfering cells and the subscriber unit, and on the ratio of the other-cell interference to intra-cell interference.

The SNR for the receiver 100 can be compared to SNR for a matched filter such as a RAKE filter. The limiting performance of the equalizer can be evaluated most directly by computing the SNR of an infinite impulse response (IIR) MMSE equalizer.

Let $\{f_i\}$ denote the coefficients of the impulse response of the channel from the desired sector to the mobile station which includes the receiver 100, and let F(z) denote the z-transform of the channel, given by $F(z)=\Sigma f_i z^{-i}$. The MMSE equalizer C(z) for this application is given by $$C(z) = \frac{F^*(1/z)}{P(z) + (I_{oc}/I_{or})},$$

where $P(z)=F(z)F^*(1/z)$ and $I_{oc}/I_{or}$ denotes the ratio of other-cell interference (including AWGN) to intra-cell interference.

The chip signal to noise ratio at the output 122 of the MMSE equalizer C(z) is given by $$\left(\frac{E_c}{N_t}\right)_{MMSE} = \frac{E_c}{I_{or}}\left(\frac{b_o}{1-b_o}\right),$$

where $$b_o = \frac{1}{2\pi}\int_{-\pi}^{\pi} \frac{P(e^{j\omega})}{P(e^{j\omega}) + (I_{oc}/I_{or})} d\omega,$$

where and $E_c/N_t$ is the ratio of chip energy to total noise on the channel. By way of comparison, the chip signal to noise ratio of the matched filter receiver such as a RAKE receiver is given by $$\left(\frac{E_c}{N_t}\right)_{MF} = \frac{E_c}{I_{or}}\left(\frac{1}{\Sigma p_i^2 - 1 + (I_{oc}/I_{or})}\right),$$

where the sequence $\{P_i\}$ is the inverse z-transform of P(z). In both of the above equations, it has been assumed that the energy of the channel $\{f_i\}$ is equal to 1 so that $\Sigma|f_i|^2=1$ (implying that $|p_o|^2=1$). Also, in both of the above equations, the other-cell interference $I_{oc}$ has been assumed to have the same statistical properties as additive white Gaussian noise.

The improvement in performance achievable with the MMSE equalizer is independent of $E_c/I_{or}$, the fraction of forward link energy allocated to the desired traffic channel. This is different from the standard single-user equalization problem in which the improvement of the equalizer depends on the signal to noise ratio. For this reason, the performance improvement of the MMSE equalizer on a given channel P(z) is solely a function of $I_{oc}/I_{or}$. The performance improvement, $\Delta$, is the ratio of the chip signal to noise ratios of the two receivers, and is given by $$\Delta = \left(\left(\frac{b_o}{1-b_o}\right)\left(\Sigma p_i^2 - 1 + (I_{oc}/I_{or})\right)\right).$$

For small $I_{oc}/I_{or}$, large improvements in receiver performance are achievable because the MMSE equalizer closely approximates the zero-forcing equalizer, which suppresses the dominant intra-cell interference. For large $I_{oc}/I_{or}$, the MMSE receiver and the matched filter receiver are nearly equivalent, so that equalization yields only a slight performance benefit. However, this is true only if the additive Gaussian noise is white. Additive interference attributable to other-cell interference filtered by a multipath channel is in general non-white, and large gains in performance can be achieved by suppressing the other cell interference with an MMSE equalizer.

As is indicated in FIG. 1, in accordance with the present invention, the MMSE equalizer is implemented adaptively using the pilot signal. An error signal is produced in response to the pilot signal and used to adapt the adaptive equalizer 104. Any suitable adaptation algorithm, such as least mean squares (LMS) or recursive least means squares (RLS) may be used.

The adaptive equalizer 104 can be adapted at any integer multiple of the chip rate. That is, the number of chips summed in the summer 138 can be chosen to be any positive integer. The adaptive MMSE solution is independent (within a scale factor) of the number of chips combined prior to measurement of the error. The signal to noise ratio of the observation used to measure the error increases with the number of chips summed, while the iteration speed of the algorithm decreases. The convergence speed of the equalizer can be optimized over the number of chips summed by determining the best tradeoff of measurement SNR against iteration speed of the adaptation algorithm.

A limitation on the number of computations per second allotted to the equalizer may limit the maximum iteration speed of the equalizer. If so, the number of chips summed prior to the measurement of the error can be increased until the number of computations per second required by the adaptation algorithm falls below the specified maximum.

The measured mean square error in FIG. 1 is not the true mean square error unless the number of chips combined is an integer multiple of 64 and the interval over which the chips are summed is aligned with a Walsh code boundary. The reason for this is that intra-cell interference can only be measured over a span of an integer number of Walsh codes. Distinct Walsh codes of particular length, e.g., 64, are in general only orthogonal over this length and are not in general orthogonal over sub-intervals.

In the discussion above, other-cell interference is treated as additive white Gaussian noise. However, the interference from any particular sector is more appropriately viewed as colored Gaussian noise. If other-cell interference from a single sector interferer is observed through a multipath channel, the interference is no longer white due to the spectral shaping introduced by the channel. Let the channel between the other cell and the mobile receiver have impulse $\{g_i\}$ and z-transform $G(z)=\Sigma g_i z^{-i}$. With these definitions, the power spectrum of the other-cell interference becomes $I_{oc} \rightarrow I_{oc} G(z) G^*(1/z),$ where it has been assumed that the channel has been normalized so that $\Sigma|g_i|^2=1$.

This problem, in which the other cell also passes through a multipath channel can be made equivalent to the problem considered above by whitening the noise from the other cell by using the filter $G^{-1}(z)$. The equivalent channel that results for the desired sector is simply $$F'(z)=F(z)G^{-1}(z).$$

All of the results for the MMSE receiver above now follow with $F(z)$ replaced by $F'(z)$.

The expressions for both the performance of the matched filter receiver and the improvement of the equalizer relative to the matched filter must be updated for non-white other-interference. The performance of the matched filter can be modified for non-white other-cell interference using the following. Let $$c_o = \frac{1}{2\pi}\int_{-\pi}^{\pi} F(e^{iw})F^*(e^{-iw})G(e^{iw})G^*(e^{-iw})dw$$

$$= \frac{1}{2\pi}\int_{-\pi}^{\pi} X(e^{iw})G(e^{iw})G^*(e^{-iw})dw$$

With this definition, the SNR for the matched filter receiver is given by $$\left(\frac{E_c}{N_t}\right) = \frac{E_c}{I_{or}}\left(\frac{1}{\sum p_i^2 - 1 + (I_{oc}/I_{or})c_0}\right),$$

and the difference, $\Delta$, in SNR between the MMSE equalizer and the matched filter receiver is given by $$\Delta = 10 \log\left(\left(\frac{b_o}{1-b_o}\right)\left(\sum p_i^2 - 1 + (I_{oc}/I_{or})c_0\right)\right),$$

where $b_o$ is now evaluated for $F'(z)$ rather than for $F(z)$.

The adaptive equalizer 104 will automatically suppress non-white interference from other cells or sectors. No modifications of the equalizer are necessary.

Within a multiplicative constant, the MMSE equalizer is the same for all traffic channels transmitted from the same sector. This result has two important consequences. First, the equalizer can be trained using the unmodulated pilot signal available on IS-95. Secondly, in high data rate applications where multiple traffic channels are assigned to a single subscriber, all of the traffic channels can be demodulated using the same equalizer. It is also shown formally that the equalizer can be updated at any multiple of the chip rate.

Let the sequence $\{r_i\}$ denote the input to the equalizer in FIG. 1. This sequence can be written as $$r_i = \sum_{j=1}^{\# users} A_j \sum_k b_{j,k} \sum_{l=1}^{L} f_l p_{j,i+64k-l} + n_i,$$

where, for the j-th channel (Walsh code), $A_j$ denotes the signal amplitude, $b_{j,k}$ denotes the k-th data symbol, and the sequence $\{p_{j,l}\}$ denotes the spreading sequence (here the spreading sequence referred to is the composition of the Walsh code and the length $2^{15}$ augmented MLSR sequence). The sequence $\{f_l\}$ denotes the channel between the desired sector and the mobile, and the sequence $\{n_i\}$ is a stationary Gaussian noise sequence, which is generally non-white. Note that in FIG. 1, the Walsh correlator for the pilot channel sums over N chips, while the Walsh correlator for the traffic channel sums over 64 chips (the number of chips per bit in IS-95). This generalization of the pilot correlator will be used to address an issue related to the rate at which the equalizer can be updated. Assume that the desired signal is transmitted on channel 1, and define the vector R of length L, given by $$R_l = \sum_{i=1}^{N} r_{l+i-1} p_{1,i}^*.$$

By definition, the length-L MMSE equalizer c minimizes the mean-square error, given by $$E(|R^H c - 1|^2),$$

where the superscript H is used to denote the conjugate transpose. The above definition can be used to show that the MMSE equalizer is given by $$c = E(RR^H)^{-1}\ E(R) = \Gamma^{-1}\ \mu,$$

where the covariance matrix $\Gamma$ has dimension LxL, and $\mu$ is a vector of length L with elements given by $$\mu_l = E(R_l) = NA_1 f_l.$$

For a CDMA system with orthogonal channels (such as Walsh codes), the covariance matrix $\Gamma$ is given by $$\Gamma_{l,m} = E(R_l R_m^*) = \left(N\sum_j A_j^2 \sum_{k \neq l} f_k f_{m-l+k}^*\right) +$$
$$N^2 A_1^2 f_l f_m^* + N\varphi(m-1) +$$
$$(1-\delta(N-64))N\left(\sum_{j \neq 1} A_j^2\right)f_l f_m^*,$$

(orthogonal codes)

where $\varphi(.)$ is the covariance of the additive noise sequence $\{n_i\}$, and $\delta$ is used to denote the Dirac delta function. Note that if the correlation length N is equal to 64, the number of chips per symbol, the last term in the summation is identically 0. For a system employing random codes (independently and identically distributed sequences of Bernoulli random variables), the factor with the delta function multiplying the last term disappears, and the covariance matrix is given by $$\Gamma_{l,m} = \left(N\sum_j A_j^2 \sum_{k \neq l} f_k f_{m-l+k}^*\right) + N^2 A_1^2 f_l f_m^* + N\varphi(m-1) +$$
$$\left(\sum_{j \neq 1} A_j^2\right)f_l f_m^*.$$

(random codes)

The noise sequence $\{n_i\}$ contains both white Gaussian noise of spectral intensity $N_o$ and multiple-access interference from other sectors. For the purpose of illustration, a single sector is assumed to be the source of all multiple-access interference not from the desired sector. Let the sequence $\{g_l\}$ denote the channel between this interfering sector and the subscriber unit. With this model, the covariance of the additive noise sequence $\{n_i\}$ is given by $$\varphi(m) = N_0 + \left(\sum_l B_k^2\right)\left(\sum_l g_l g_{l+m}^*\right)$$

where $B_j$ denotes the amplitude of the j-th channel (Walsh code) from the interfering sector.

With the above definitions, the mean square-error at the output of the MMSE equalizer c can be written as $$MSE_c = 1 - \mu^H \Gamma^{-1} \mu,$$

and the signal-to-noise ratio is given by $$SNR_c = \frac{\mu^H \Gamma^{-1} \mu}{1 - \mu^H \Gamma^{-1} \mu}.$$

We can now make the following observations about the MMSE equalizer defined above. First, within a multiplicative constant, the MMSE equalizer is the same for all traffic channels. Second, within a multiplicative constant, the MMSE equalizer is the same for a CDMA system using orthogonal codes (such as the Walsh codes used in IS-95) and a system using random spreading codes.

From the first observation, it follows that only one equalizer is required to demodulate all of the traffic channels arriving from a particular sector. Furthermore, the first observation implies that the IS-95 pilot signal can be used to train the MMSE equalizer, and more generally, that any unmodulated traffic channel can be used to train the MMSE equalizer.

The second observation is important because it allows for the adaptation of the MMSE equalizer at rates other than the symbol rate. If the correlation length N is less than the Walsh code length 64, the contribution of spreading codes other than the channel of interest to the correlator output will no longer be zero, and the covariance matrix $\Gamma$ will be the same as for a CDMA system with random spreading codes. Thus, for any correlation length N, the MMSE equalizer for the pilot channel is within a multiplicative constant of the desired channel's MMSE equalizer. Therefore, if we choose to train the equalizer using the pilot channel, the equalizer can be updated at any rate which is equal to a multiple of the chip rate (as in FIG. 1).

The observations above can be proved using the Sherman-Morrison Identity. To begin, let the matrix $\Lambda$ be defined as $$\Lambda_{l,m} = \left(N \sum_j A_j^2 \sum_{k \neq l} f_k f_{m-l+k}^*\right) + N\varphi(m-1).$$

With this definition, it follows that $$\Gamma = \Lambda + \left(N^2 A_1^2 + (1 - \delta(N-64))N\left(\sum_{j \neq 1} A_j^2\right)\right) ff^H = \Lambda + \alpha ff^H,$$

for orthogonal codes, and that $$\Gamma = \Lambda + \left(N^2 A_1^2 + N\left(\sum_{j \neq 1} A_j^2\right)\right) ff^H = \Lambda + \beta ff^H$$

for random codes. In the above, f is a vector of the channel coefficients $\{f_l\}$, and the multiplicative constants $\alpha$ and $\beta$ are defined implicitly as indicated. Now, note that $\Lambda$ and f do not depend on which channel is being equalized (in this case, channel 1), or on whether the traffic channels are orthogonal. Furthermore, neither $\Lambda$ and f depend on N, the number of chips combined.

With the above definitions, we have $$c = \Gamma^{-1}\mu$$
$$= (\Lambda + \eta ff^H)^{-1} N A_1 f$$

where $\eta$ is equal to $\alpha$ or $\beta$, according to whether the channels are orthogonal or random. Using the Sherman-Morrison Identity, this becomes $$c = (\Lambda - \eta ff^H)^{-1} N A_1 f$$
$$= NA_1\left(\Lambda^{-1} f - \frac{\eta}{1+\lambda} \Lambda^{-1} ff^H \Lambda^{-1} f\right)$$
$$= NA_1\left(1 + \frac{\eta}{1+\lambda} f^H \Lambda^{-1} f\right) \Lambda^{-1} f$$
$$= \kappa \Lambda^{-1} f,$$

for appropriate constants $\lambda$ and $\kappa$. From the last equality, it is apparent that, within a scaling factor $\kappa$ (which depends on the particular channel, the number of chips combined N, and whether the codes are orthogonal or random), the MMSE equalizer depends only on $\Lambda$ and f. This completes the proofs of the observations above.

The multiplicative constant is unimportant in the sense that any equalizer $\epsilon c$, differing from the MMSE equalizer by only a positive constant $\epsilon$, will yield an output with the same SNR as the output of the MMSE equalizer. However, while the SNR of the equalizer output is not affected by a multiplicative constant, any such scaling factor is potentially still important in two respects. First, depending on the receiver design, inappropriate scaling may increase the required receiver dynamic range. While the scaling factor of each traffic channel's MMSE equalizer is potentially different, the gain of any single equalizer is the same for all traffic channel signals which pass through it. Thus, the inclusion of an equalizer in the receiver should not affect any dynamic range issues in the signal path following the equalizer. Second, in soft-handoff, correct scaling of the output of each equalizer is required in order to maximize the SNR of the combined result. Use of a receiver according to the present invention during soft handoff will be discussed below in conjunction with FIG. 2 and FIG. 3.

An important advantage is provided by use of a receiver such as receiver 100 including an adaptive equalizer. The MMSE equalizer is the same no matter what channel (Walsh code) is being demodulated. This permits the adaptive equalizer to train and adapt using the pilot channel. Moreover, in some applications for transmitting data at high data rates, several Walsh codes may be assigned to a single user. Since the equalizer is the same for all channels, the high data rate user can use the same equalizer for all of the channels to be demodulated.

Figure 2:
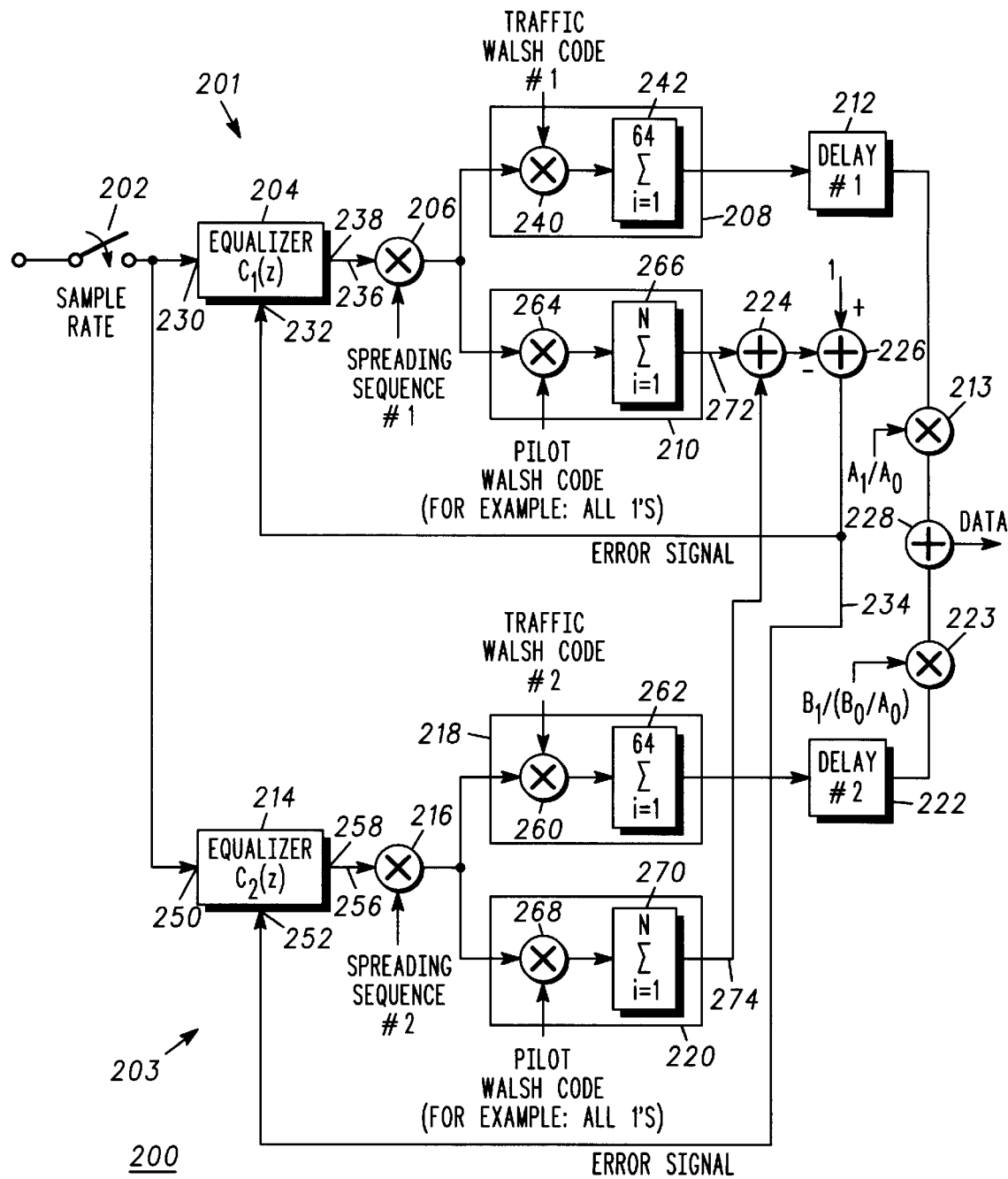
FIG. 2 is a block diagram of a second embodiment of a receiver in accordance with the present invention.

Referring now to FIG. 2, it shows a second embodiment of a receiver according to the present invention. Receiver 200 includes a sampler 202, a first receiver circuit 201 and a second receiver circuit 203. In this embodiment, the receiver is configured for joint adaptation of two MMSE equalizers for a mobile station in soft handoff between two remote transceivers or base stations.

The first receiver circuit 201 includes a first adaptive equalizer 204, a first despreader 206, a first traffic channel demodulator 208, a first pilot channel demodulator 210, a first delay element 212 and a gain element 213. Similarly, the second receiver circuit 203 includes a second adaptive equalizer 214, a second despreader 216, a second traffic channel demodulator 218, a second pilot channel demodulator 220, a second delay element 222 and a gain element 223. Each receiver circuit may be assigned to receive a spread spectrum signal from a remote transmitter, such as a base station. To complete the identification of the elements in FIG. 2, the receiver 200 further includes a combiner 224, a summer 226 and a combiner 228. The received signals are combined in the combiner 228 for further processing.

Each of receiver circuit 201 and receiver circuit 203 operates similarly to receiver 100 in FIG. 1. The sampler 202 converts the received spread spectrum signal to a discrete time signal at the sample rate, which is an integer multiple of the chip rate, such as one, two, four or eight times the chip rate. In the first receiver circuit 201, the adaptive equalizer 204 has an input 230 for receiving the spread spectrum signal and input 232 for receiving an error signal 234. The adaptive equalizer 204 suppresses interference on the spread spectrum signal to produce an equalized signal 236 at an output 238. The despreader 206 despreads the equalized signal 236 in response to a predetermined spreading sequence. The traffic channel demodulator 208 demodulates the equalized, despread signal to produce an estimate of the data sequence transmitted on the traffic channel. The traffic channel demodulator includes a despreader 240 and a summer 242. The despreader 240 despreads the equalized signal by applying the appropriate Walsh code for the traffic channel of interest. The summer 242 sums chips over an interval, such as 64 chips, to produce a demodulated traffic channel. The demodulated data is delayed by a predetermined time in the first delay element 212, multiplied by an appropriate gain in gain element 213, then passed to the combiner 228.

In the second receiver circuit 203, the adaptive equalizer 214 has an input 250 for receiving the sampled spread spectrum signal and input 252 for receiving the error signal 234. The adaptive equalizer 214 suppresses interference on the spread spectrum signal to produce an equalized signal 256 at an output 258. The despreader 216 despreads the equalized signal 256 in response to a predetermined spreading sequence. The spreading sequences used by the first receiver circuit 201 and the second receiver circuit 203 correspond to particular base stations. In soft handoff, the each receiver circuit will be receiving signals from a different base station, so the spreading sequences will be different. For example, in IS-95, the spreading sequences are different phases of a common sequence.

The traffic channel demodulator 218 demodulates the equalized, despread signal to produce an estimate of the data sequence transmitted on the traffic channel. The traffic channel demodulator includes a despreader 260 and a summer 262. The despreader 260 despreads the equalized signal by applying the appropriate Walsh code for the traffic channel of interest. The summer 262 sums chips over an interval, such as 64 chips, to produce demodulated data. The demodulated data is delayed by a predetermined time in the second delay element 222, multiplied by an appropriate gain in gain element 223, then passed to the combiner 228 for combination with the demodulated data from the first receiver circuit 201.

The pilot channel demodulator 210 of the first receiver circuit 201 and the pilot channel demodulator 220 of the second receiver circuit 203 are configured for joint adaptation of the two adaptive equalizers of the receiver 200. In each receiver circuit, the pilot channel demodulator demodulates the equalized, despread signal received from the adaptive equalizer to produce a pilot channel estimate. The pilot channel demodulator 210 includes a despreader 264 and a summer 266. The despreader 264 applies the pilot channel Walsh code to despread the equalized signal. The despread chips are summed in the summer 266 over a predetermined interval to produce an estimated pilot signal 272. Similarly, the demodulator 220 includes a despreader 268 and a summer 270. The despreader 268 applies the pilot channel Walsh code to despread the equalized signal. The despread chips are summed in the summer 270 over a predetermined interval to produce an estimated pilot signal 274.

In the illustrated embodiment, the pilot Walsh code used in both receiver circuits is the same code, all logical 1's. This is consistent with an IS-95 implementation. However, it may be necessary to use different Walsh codes to despread the different pilots channels. Also, as discussed above. the summer 266 and the summer 270 may sum any integral number of chips, such as 64.

The estimated pilot signal 272 from the first receiver circuit 201 and the estimated pilot signal 274 from the second receiver circuit 203 are combined in the combiner 224. The combiner 224 sums the two estimated pilot signals and provides the result to the summer 226. The summer 226 combines the result and a predetermined data pattern to form the error signal 234. In FIG. 2, the predetermined data pattern is all 1's, like the pilot signal in IS-95. The error signal 234 is provided to both the adaptive equalizer 204 and the adaptive equalizer 214.

In the embodiment of FIG. 2, the two adaptive equalizers adapt to a common error signal. This is referred to herein as joint adaptation. With joint adaptation, the error is measured after the two equalizers have been combined. In this implementation, the amplitudes of the equalizer coefficients scale automatically to maximize the SNR of the combined result. Note, however, that the indicated gain corrections are required if either the pilot amplitudes or the amplitudes of the traffic channels are unequal. In FIG. 2, $A_o$ and $B_o$ denote the pilot amplitudes, and $A_1$ and $B_1$, denote the amplitudes of the traffic channels of interest.

The signal from a base or sector is "active" so long as the base or sector is transmitting to the subscriber of interest over the traffic channel. It is still considered active even if an equalizer is not assigned. Similarly, a base station or sector is typically said to be in soft handoff with a subscriber if the base or sector is transmitting data to the subscriber over a traffic channel. Typically, this is independent of whether or not the subscriber unit assigns a finger or an equalizer to the sector.

For soft handoff, the receiver 200 receives first spread spectrum signals from a first remote transmitter and receives second spread spectrum signals from a second remote transmitter. The remote transmitters may be base stations serving cells of a cellular radiotelephone system, or may be transmitters serving sectors of a single cell in such a system. This is an example of two-way soft handoff. In alternative embodiments, additional receiver circuits and adaptive equalizers may be provided to enable three-way, four-way . . . n-way soft handoff.

The receiver 200 produces an error signal in response to at least one of the first spread spectrum signals and the second spread spectrum signals. In the joint adaptation case of FIG. 2, the error signal is produced in response to both spread spectrum signals. The receiver 200 adaptively equalizes the first spread spectrum signals and the second spread spectrum signals in response to the error signal to produce a first equalized signal 236 and a second equalized signal 256. The receiver 200 further demodulates a first traffic channel from the first equalized signal 236 and a second traffic channel from the second equalized signal 256. Finally, the receiver 200 combines the first traffic channel and the second channel in the combiner 228 as received data.

If more than two cells or sectors are in soft handoff, the receiver 200 may detect a plurality of spread spectrum signals including the first spread spectrum signals and the second spread spectrum signals. If more sectors are in soft handoff with the receiver than the receiver has adaptive equalizers, the receiver 200 selects the sectors having the best quality as active signals and enters soft handoff with the transmitters which transmit those active signals. The receiver 200 assigns a first adaptive equalizer to the first sector and assigns a second adaptive equalizer to the second sector. When a signal quality estimate of one of the sectors in soft handoff but wo which no equalier is assigned exceeds a signal quality estimate of a sector that has been assigned an equalizer, the receiver 200 substitutes the one signal for the other signal by reassigning an adaptive equalizer. In this way, the receiver 200 assigns its resources to the base stations or sectors having the best signal quality.

Figure 3:
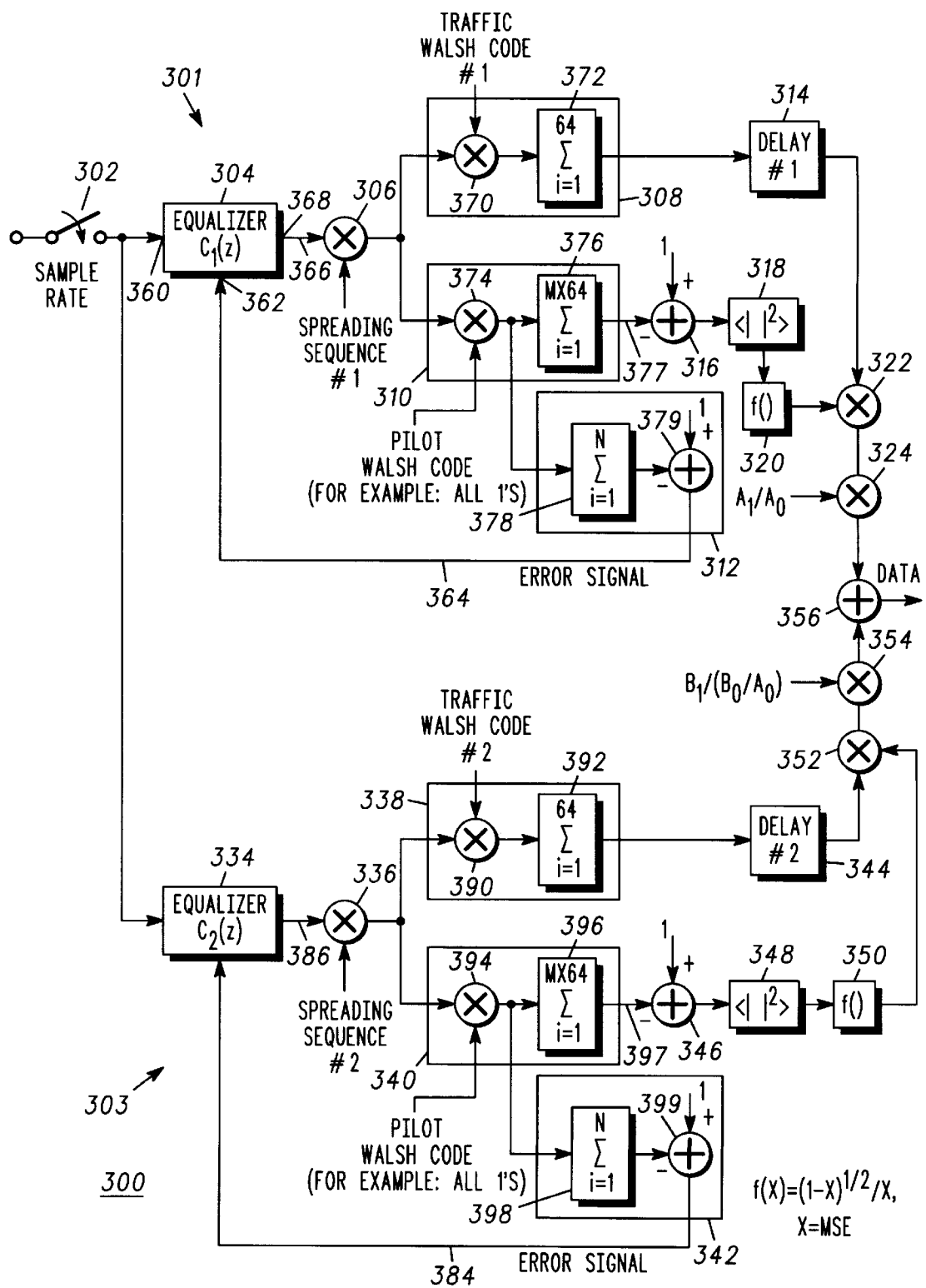
FIG. 3 is a block diagram of a third embodiment of a receiver in accordance with the present invention.

FIG. 3 shows a third embodiment of a receiver according to the present invention. Receiver 300 includes a sampler 302, a first receiver circuit 301 and a second receiver circuit 303. In this embodiment, the receiver is configured for individual adaptation of two MMSE equalizers for a mobile station in soft handoff between two remote transceivers or base stations.

The first receiver circuit 301 includes a first adaptive equalizer 304, a first despreader 306, a first traffic channel demodulator 308, a first pilot channel demodulator 310, a first error signal generator 312, a first delay element 314, a summer 316, a signal-to-noise ratio (SNR) calculator 318, a coefficient calculator 320, a gain element 322 and a gain element 324. Similarly, the second receiver circuit 303 includes a second adaptive equalizer 334, a second despreader 336, a second traffic channel demodulator 338, a second pilot channel demodulator 340, a second error signal generator 342, a second delay element 344, a summer 346, a SNR calculator 348, a coefficient calculator 350, a gain element 352 and a gain element 354. The output signal from each receiver circuit is summed in a summer 356. The receiver circuits will be assigned to receive a spread spectrum signal from different transmitters, such as a base station.

Each of receiver circuit 301 and receiver circuit 303 operates similarly to receiver 100 in FIG. 1. In the first receiver circuit 301, the sampler 302 converts the received spread spectrum signal to a discrete time signal at the sample rate. The sample rate is an integer multiple of the chip rate, such as one ttimes, two times, four times or eight times the chip rate. The adaptive equalizer 304 has an input 360 for receiving the spread spectrum signal and an input 362 for receiving an error signal 364. The adaptive equalizer 304 suppresses interference on the spread spectrum signal to produce an equalized signal 366 at an output 368. The despreader 306 despreads the equalized signal 366 in response to a predetermined spreading sequence. The traffic channel demodulator 308 demodulates the equalized, despread signal to produce an estimate of the data sequence transmitted on the traffic channel. The traffic channel demodulator 308 includes a despreader 370 and a summer 372. The despreader 370 despreads the equalized signal by applying the appropriate Walsh code for the traffic channel of interest. The summer 372 sums chips over an interval, such as 64 chips for IS-95, to produce demodulated data.

The demodulated data is delayed by a predetermined time in the first delay element 314, multiplied by appropriate gains in gain element 322 and gain element 324, then passed to the summer 356.

The pilot channel demodulator 310 demodulates the equalized, despread signal from the despreader 306 and the adaptive equalizer 304 to produce a pilot channel estimate. The pilot channel demodulator 310 includes a despreader 374 and a summer 376. The despreader 374 applies the pilot channel Walsh code, such as an all logical 1 code, to despread the equalized signal. The despread chips are summed in the summer 376 over a predetermined interval, such as 64 chips, to produce an estimated pilot signal 377. In the summer 316, the estimated pilot signal 377 is compared with a predetermined data sequence, such as the all logical 1 data sequence of the pilot signal. The first error signal generator 312 includes a summer 378 and a summer 379. The summer 378 receives the despread chips from the despreader 374 and sums chips over a predetermined interval. The interval can be any integer multiple of the chip rate. The output of the summer 378 is compared in the summer 379 with a predetermined data sequence such as the all 1 data sequence of the pilot signal to produce the error signal 364.

The second receiver circuit 303 operates substantially similarly. The adaptive equalizer 334 suppresses interference on the spread spectrum signal in response to an error signal 384 to produce an equalized signal 386. The despreader 336 despreads the equalized signal 386 in response to a predetermined spreading sequence. The traffic channel demodulator 338 demodulates the equalized, despread signal to produce an estimate of the data sequence transmitted on the traffic channel. The traffic channel demodulator 338 includes a despreader 390 and a summer 392 which operate similarly to the despreader 370 and the summer 372 of the first receiver circuit 301. The demodulated traffic symbols are provided to the second delay element 344, delayed a predetermined time and then provided to the gain element 352 and the gain element 354. The pilot channel demodulator 340 includes a despreader 394 and a summer 396. The despreader 394 and the summer 396 produce an estimated pilot signal 397. In the summer 346, the estimated pilot signal 397 is compared with a predetermined data sequence, such as the all logical 1 data sequence of the pilot signal. The second error signal generator 342 includes a summer 398 and a summer 399. The summer 398 receives the despread chips from the despreader 394 and sums chips over a predetermined interval. The interval can be any integer multiple of the chip rate. The output of the summer 398 is compared in the summer 399 with a predetermined data sequence such as the all 1 data sequence of the pilot signal to produce the error signal 384.

Thus, the receiver 300 individually adapts the adaptive equalizers and combines the outputs of the two receiver circuits. With individual adaptation, the signal-to-noise ratio of each equalizer must be estimated or measured so that the optimal combining coefficients can be computed. The SNR calculator 318, 348 estimates SNR for each receiver circuit. The coefficient calculator 320, 350 determines optimal combining coefficients for each receiver circuit. In general, if the mean and variance of the equalizer output are given by $\zeta$ and $\sigma^2$, respectively, the optimal combining coefficient is $\zeta/\sigma^2$. As in the case of joint adaptation illustrated in FIG. 2, the indicated gain corrections, using $A_0$, $A_1$, $B_0$, and $B_1$, are required if either the pilot amplitudes are unequal, or the traffic channel amplitudes are unequal. Here, $A_0$ and $B_0$ denote the pilot amplitudes of the two sectors and $A_1$, and $B_1$ denote the traffic channel amplitudes. The use of separate or individual adaptation requires that the number of chips combined prior to measurement of the mean square error be a multiple of 64 chips and that the combining interval be aligned with the Walsh code boundaries. Gain corrections are made for the amplitudes of the pilot channel and the traffic channel. The adaptive equalizers can be updated at any integer multiple of the chip rate.

Soft handoff using receiver 300 operates similarly to soft handoff using receiver 200 in FIG. 2. However, the error signal is produced separately for each receiver circuit and used for adaptation of the individual equalizers.

Figure 4:
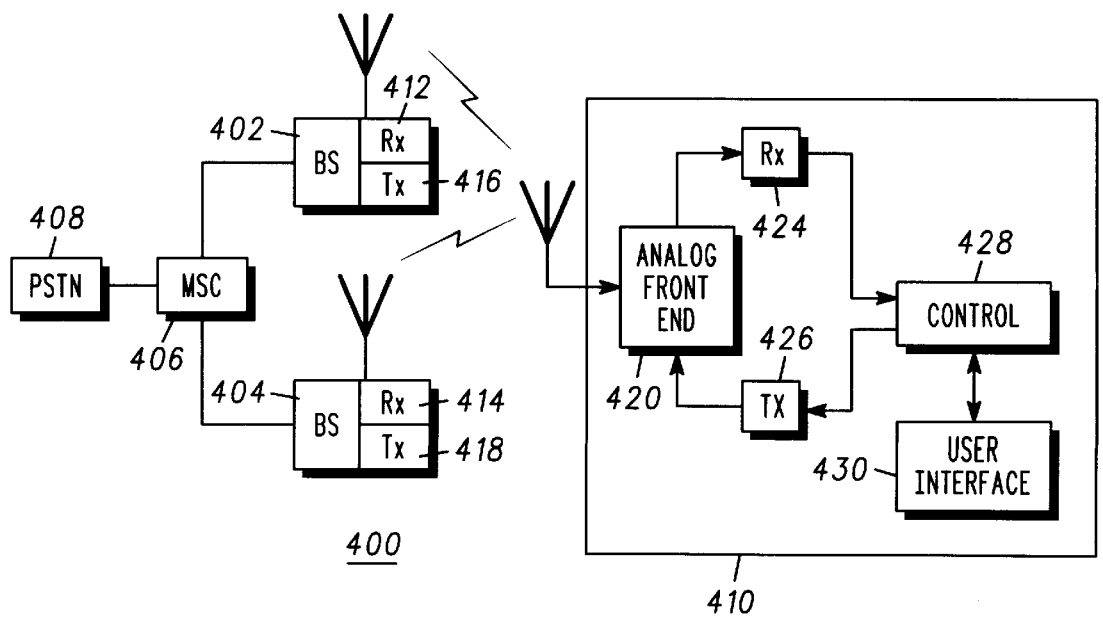
FIG. 4 is a block diagram of a spread spectrum communication system.

FIG. 4 shows a spread spectrum communication system 400 in which the present invention may be employed. The communication system 400 includes a plurality of base stations including base station 402 and base station 404. Each base station is separately coupled to a mobile switching center 406 which controls communication within the system and between the system and the public switched telephone network 408. The communication system 400 may be a cellular telephone system operating according to IS-95, another type of cellular or mobile communication system, a fixed wireless local loop system or other type of radio system.

Each base station is configured for radio frequency (RF) communication with fixed or mobile transceivers such as mobile station 410. Accordingly, each base station includes a receiver such as receiver 412 of base station 402 and receiver 414 of base station 404 and a transmitter such as transmitter 416 of base station 402 and transmitter 418 of base station 404. Each transmitter transmits a spread spectrum signal including a first signal and a second signal, the first signal being substantially orthogonal to the second signal. The first signal may be, for example, the pilot channel in the IS-95 implementation and the second signal may be one or more traffic channels. In IS-95, the pilot channel and the traffic channels are each covered using a Walsh or Hadamard code, so that at transmission, the channels are all substantially orthogonal.

The mobile station 410 includes an analog front end 420, a receiver 424, a transmitter 426, a control section 428 and a user interface 430. The analog front end 420 filters the spread spectrum signals and provides conversion to baseband signals. The analog front end 420 further provides analog to digital conversion, converting the baseband signals to streams of digital data for further processing. The receiver 424 demodulates the digital data and provides the demodulated data to the control section 428. The receiver 424 is preferably implemented as receiver 100 (FIG. 1), receiver 200 (FIG. 2) or receiver 300 (FIG. 3). The control section 428 controls overall operation of the mobile station 410, including assignment of the adaptive equalizers in the receiver when the mobile station 410 is in soft handoff with the base station 402 and the base station 404. The control section also controls interaction of the radio components and the user interface 430. The user interface typically includes a display, a keypad, a speaker and a microphone. The transmitter 426 modulates data for transmission to a remote receiver, such as one of the base stations. The modulated data are processed by the analog front end 420 and transmitted at radio frequency.

In any communication system, the quality or reliability of the received channel symbols will vary according to the quality of the channel. In a mobile cellular system, the channel changes due to movement of the mobile station or subscriber unit as well as to other factors. As a result, the channel fades and the multipath profile of the channel changes over time.

In systems with coding, such as IS-95 which uses convolutional coding, reliability information can be exploited by the decoder. In IS-95, a Viterbi decoder is used to decode the received transmission at the mobile station. The Viterbi decoder is a maximum-likelihood decoder, which selects or decodes the information sequence which minimizes a particular decoding metric. Other types of codes and decoders can also exploit reliability information. Maximum-likelihood decoding and minimum distance decoding (or generalized minimum distance decoding) can be applied to trellis codes, Reed-Solomon codes, BCH codes, etc.

In order to best utilize equalization in a system with coding, the output of the equalizer, such as the demodulated data at output 116 in FIG. 1, or the combined equalizer output in a system in soft-handoff, such as the data from summer 356 in FIG. 3 should be scaled by an estimate of the signal-to-noise ratio. Just as the signal-to-noise ratio is used to appropriately (optimally) scale and combine the outputs of multiple equalizers (see FIG. 2, for example), the signal-to-noise ratio can be used to scale the output of a single equalizer or the combined sum of multiple equalizers to enable the Viterbi decoder to optimally decode (maximum-likelihood decode) the received transmission. Alternatively, for other types of coding and decoders, the decoding operation can be improved by providing the decoder with both the demodulated output and an estimate of the signal-to-noise ratio for this output.

FIG. 5A shows a block diagram of a receiver 500 in accordance with the present invention. The receiver 500 is structured similarly to the receiver 100 (FIG. 1) and the receiver 300 (FIG. 3) and operates similarly to those receivers. The receiver 500 includes a sampler 502, an adaptive equalizer 504, a despreader 506, a traffic channel demodulator 508, pilot channel demodulator 510, an error signal generator 512, signal to noise ratio (SNR) estimator 514 and combiner 516.

In FIG. 5A, the output of the equalizer, which is data from the traffic channel demodulator 508, is scaled by an estimate of the signal-to-noise ratio from the SNR estimator. The output of the equalizer is indicated in FIG. 5A as (1) Symbol Estimate and the estimate of the SNR is indicated as (2) SNR estimate. The output of the receiver 500 is designated as (3) Weighted Symbol Estimate.

FIG. 5B shows a Viterbi decoder 520 which may be used in conjunction with the receiver 500 of FIG. 5A. The Viterbi decoder 520 receives the weighted symbol estimate from the receiver 500. FIG. 5C shows a more general decoder 530 which may alternatively be used in conjunction with the receiver 500 of FIG. 5A. For a system with coding other than convolutional coding, but still employing maximum-likelihood or minimum distance decoding, it may be appropriate to provide the signal-to-noise ratio estimate to the decoder 530 separately from the demodulated symbol, as in FIG. 5C In soft-handoff, in which one equalizer is assigned to each sector, the receiver must either scale the combined output of the multiple equalizers by an estimate of the combined signal-to-noise ratio, or alternatively, the receiver must provide the decoder separately with an explicit estimate of the combined signal-to-noise ratio. Note that in FIG. 3, the equalizer output has already been scaled by an estimate of the combined signal-to-noise ratio. Thus, the output of the receiver 300 in FIG. 3 could be presented directly to the input of a Viterbi decoder such as decoder 520 in FIG. 5.

Recently, CDMA systems have been proposed in which the same spreading code is shared between pilot symbols and data symbols. One such system is the Alpha proposal to Universal Mobile Telecommunications Service (UMTS), also known as FRAMES Mode 2. An adaptive equalizer can be applied to these systems, although the method of adaptation must be modified. The equalizer should only be adapted when pilot symbols are received, since the error at the output of the equalizer/despreader can only be measured when the transmitted signal is known.

Figure 6:
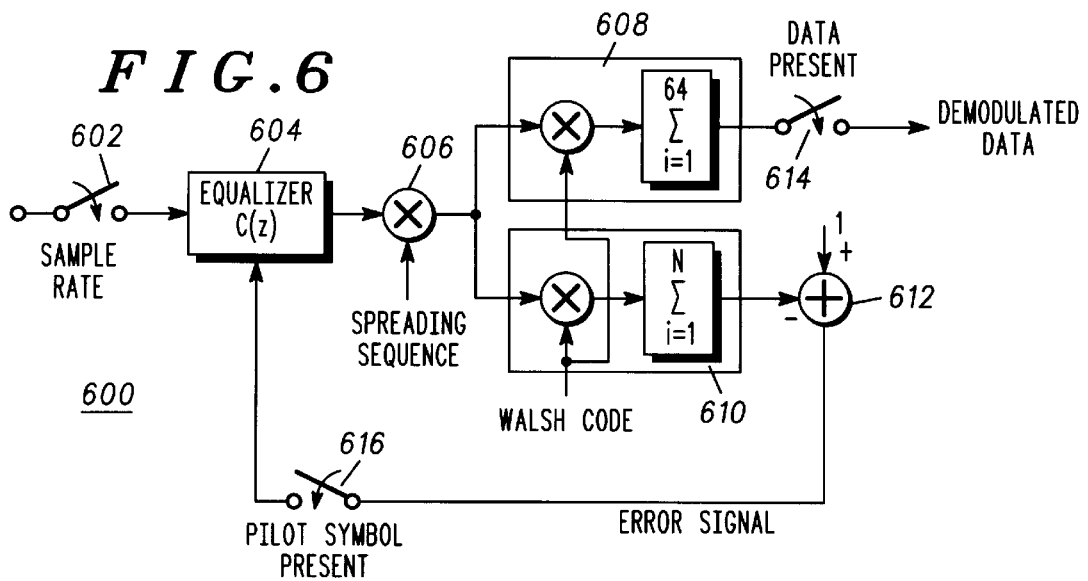
FIG. 6 is a block diagram of a receiver in accordance with the present invention.

For the data symbols received between pilot symbols or bursts of pilot symbols, there are essentially two options for the definition of the equalizer coefficients. The first option, illustrated in FIG. 6, is to freeze the equalizer coefficients in the intervals between pilot symbols. FIG. 6 is a block diagram of a receiver 600 in accordance with the present invention. The receiver 600 includes a sampler 602, an adaptive equalizer 604, a despreader 606, a traffic channel demodulator 608, a pilot channel demodulator 610 and an error signal generator 612. Structure and operation of the receiver 600 are similar to the structure and operation of the receivers described above. However, to provide for sharing of the spreading code between pilot symbols and data symbols, the receiver 600 further includes a switch 614 and a switch 616. When pilot symbols or bursts or pilot symbols are received, the switch 616 closes to permit adaptation of the equalizer 604 in response to the pilot symbols. When data symbols are received, the switch 616 opens and the switch 614 closes to convey demodulated data from the receiver 600. In this option, the same equalizer coefficients are used to demodulate all data symbols between subsequent bursts of pilot symbols.

Figure 7:
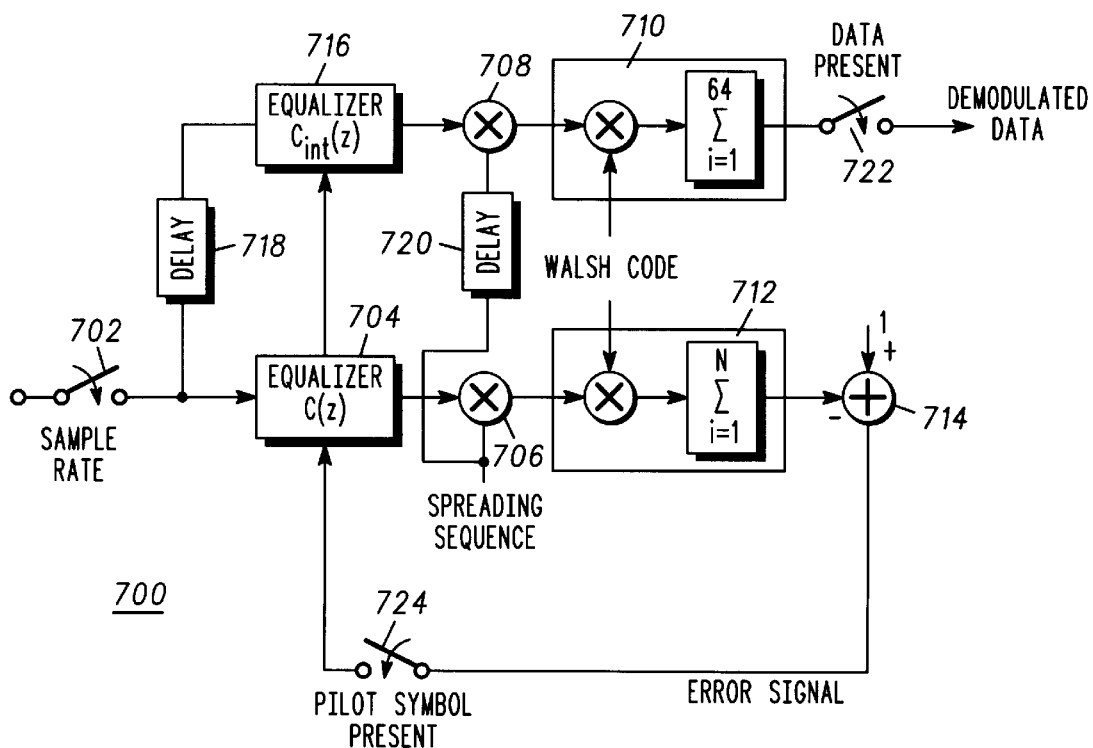
FIG. 7 is a block diagram of a receiver in accordance with the present invention.

The second option, illustrated in FIG. 7, is to use linear or other interpolation methods to define the equalizer coefficients used to demodulate the data symbols between the pilot bursts. FIG. 7 is a block diagram of a receiver 700 in accordance with the present invention. The receiver 700 includes a sampler 702, an adaptive equalizer 704, a pilot despreader 706, a traffic despreader 708, a traffic channel demodulator 710, a pilot channel demodulator 712 and an error signal generator 714. Further, the receiver 700 includes an interpolated equalizer 716, designated as $C_{int}(z)$ in FIG. 7, and a buffer or delay 718 and a delay 720.

In FIG. 7, $C_{int}(z)$ is used to denote the interpolated equalizer, where the interpolation is between the adaptive equalizer coefficients determined by the adaptive equalizer 704 at the end of the pilot bursts on either side of the data symbols of interest. As indicated in FIG. 7, if interpolation is used, it will be necessary to buffer the data symbols in the delay 718 between adjacent pilot bursts. Similarly, the spreading sequence must be buffered in the delay 720 to maintain time alignment of data symbols and spreading sequence. After a new burst of pilot symbols is received, all of the data symbols between the new pilot burst and the previous pilot burst can be demodulated. A switch 722 and a switch 724 control provision of demodulated data from the receiver 700 and adaptation of the equalizer 704, respectively. Interpolation is used to adjust the equalizer coefficients throughout the data burst.

In the UMTS Alpha concept document, a synchronization channel is defined. Once synchronization has been achieved, the synchronization channel can also be used to track the channel, if desirable. In the UMTS Alpha concept, two synchronization bursts—the primary and secondary—are transmitted during each time slot. Both of these synchronization bursts can be used in addition to the pilot burst on the shared pilot/data channel to adapt the equalizer.

Figure 8:
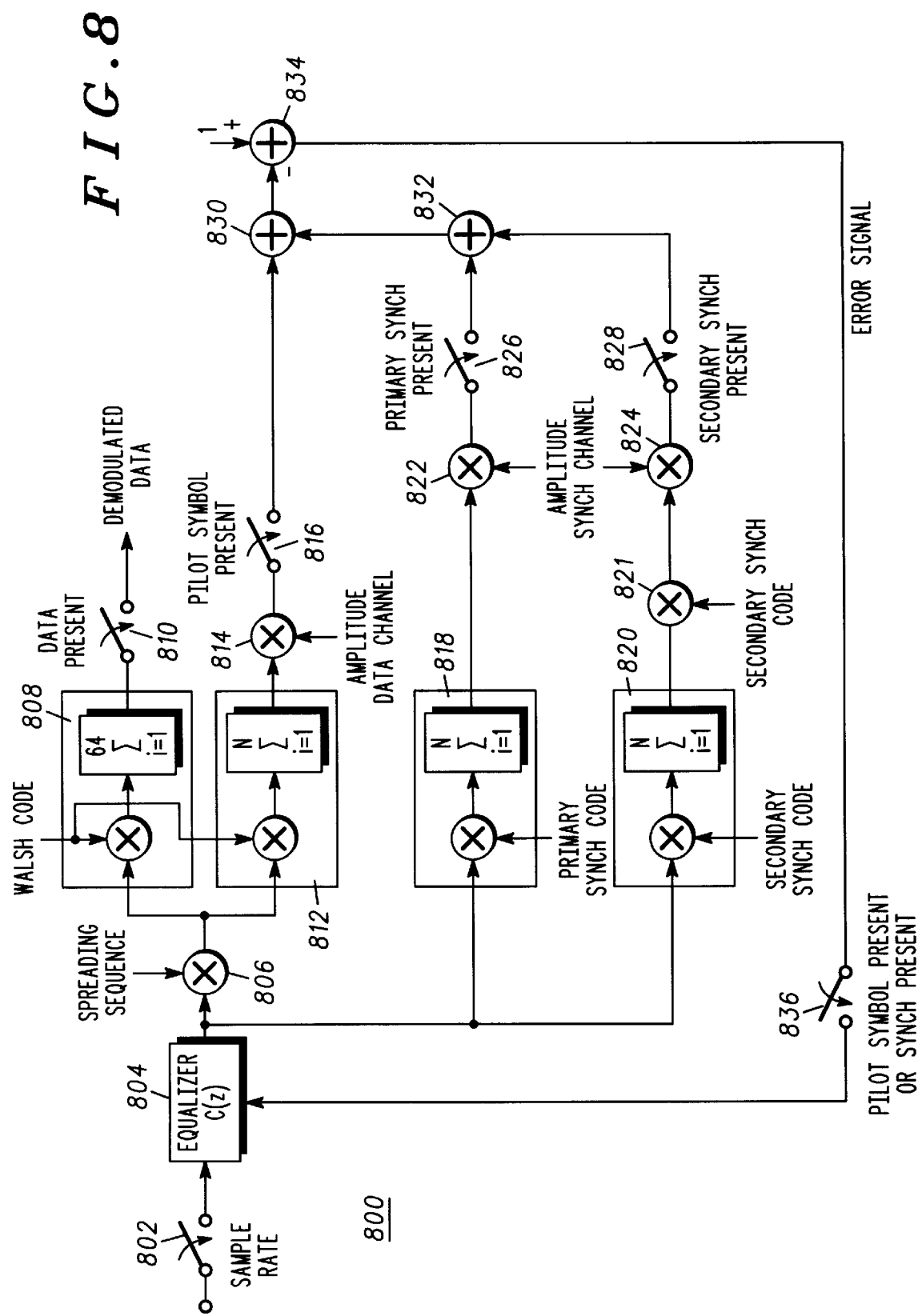
FIG. 8 is a block diagram of a receiver in accordance with the present invention.

One method for accomplishing the adaptation of the equalizer is illustrated in FIG. 8. FIG. 8 is a block diagram of a receiver 800 in accordance with the present invention.

The receiver 800 includes a sampler 802, and adaptive equalizer 804 and a traffic channel demodulator 808. When data symbols are present on the traffic channel, a switch 810 closes to provide demodulated data as the output of the receiver 800. For generating an error signal for adapting the equalizer 804, an error signal generator 834 receives signals corresponding to the pilot symbols, the primary synchronization burst and the secondary synchronization burst. A pilot channel demodulator 812 demodulates the pilot channel. In the illustrated embodiment, the demodulated pilot symbols are scaled by the amplitude of the data channel in a multiplier 814. A switch 816 closes when pilot symbols are present. In the UMTS Alpha system, the synchronization bursts are not spread, so the output of the adaptive equalizer 804 is provided directly to a primary synchronization burst demodulator 818 and a second synchronization burst demodulator 820, bypassing the despreader 806. Since the secondary synchronization burst is modulated at the time of transmission, this modulation is removed by a multiplier 821. Both demodulated synchronization bursts are scaled by the amplitude of the synchronization channel, at multiplier 822 and multiplier 824. A switch 826 closed when the primary synchronization burst is present and a switch 828 closes when the secondary synchronization burst is present. A combiner 832 combines the primary and secondary synchronization bursts and an combiner 830 combines this result with the pilot symbols. The sum is provided to the error signal generator 834. A switch 836 closes when a pilot symbol is present or when one of the synchronization bursts is present, and the adaptive equalizer 804 adapts in response to the error signal.

Thus, in FIG. 8, the equalizer is frozen between pilot/synch bursts. Alternatively, interpolation can be used if the data symbols are buffered, similar to the embodiment of FIG. 7. Note also in FIG. 8, that it is necessary to wipe off the modulation sequence used on the secondary synch channel, using the multiplier 821.

As can be seen from the foregoing, the present invention provides a communication device and method for interference suppression using adaptive equalization in a spread spectrum communication system. A receiver of the communication device includes an adaptive equalizer which adapts using a pilot signal such as the pilot channel of an IS-95 system. The communication device and method of the present invention provide important advantages.

First, the present invention provides significant performance advantages relative to a matched filter receiver such as a RAKE receiver. Large gains are achievable when $I_{oc}/I_{or}$ is small. If $I_{oc}/I_{or} \geq 1$, significant gains are achievable if the other-cell interference is dominated by only one or two sectors. When the equalizer adapts to an optimal or near-optimal solution, the performance of the MMSE equalizer is always at least as good as the matched filter receiver.

Second, use of an adaptive equalizer frees the receiver from constantly assigning and reassigning RAKE receiver fingers among the various multipath components received from sectors in soft handoff with the mobile. Instead, one equalizer is assigned to each sector in soft handoff with the mobile. Some studies have shown that for proposed wideband CDMA systems having bandwidth of 5–20 MHz, the greater ability of the receiver to resolve multipath may actually degrade receiver performance if the mobile does not assign fingers to all significant multipath. For wideband CDMA systems, the number of fingers required to combine all significant multipath may be quite large. For example, current CDMA mobiles use three or four RAKE fingers in a system with bandwidth of 1.25 MHz. If the number of fingers required in the receiver scales with bandwidth, the proposed 5, 10 and 20 MHz systems would require 16, 32 and 64 RAKE fingers, respectively. Successful assignment and reassignment of this many receiver fingers would be difficult.

While a particular embodiment of the present invention has been shown and described, modifications may be made. For example, the number of receiver circuits which are included in the receivers of FIG. 2 and FIG. 3 may be increased to any suitable number. It is therefore intended in the appended claims to cover all such changes and modifications which fall within the true spirit and scope of the invention.

What is claimed is:

1. A communication device for receiving a spread spectrum signal which includes a pilot channel and traffic channels, the pilot channel substantially orthogonal to each of the traffic channels, the communication device comprising:
    an adaptive equalizer which adapts using the pilot channel, the adaptive equalizer receiving the spread spectrum signal and producing an equalized signal;
    a demodulator for demodulating the equalized signal to produce a demodulated traffic channel;
    a pilot channel demodulator which produces a pilot channel estimate; and
    a comparator for generating an error signal in response to the pilot channel estimate, the adaptive equalizer adapting in response to the error signal.

2. A communication device as recited in claim 1 further comprising a despreader coupled to the adaptive equalizer for despreading the equalized signal in response to a predetermined spreading sequence.

3. A communication device for receiving a spread spectrum signal which includes a pilot channel and traffic channels. the communication device comprising:
    an adaptive equalizer which adapts using the pilot channel, the adaptive equalizer receiving the spread spectrum signal and producing an equalized signal; and
    a demodulator for demodulating the equalized signal to produce a demodulated traffic channel
    wherein, when a plurality of traffic channels are assigned for communication to the communication device, the adaptive equalizer produces the equalized signal for each of the plurality of traffic channels and the demodulator selectively demodulates each of the plurality of traffic channels.

4. A communication device as recited in claim 3 wherein the demodulator comprises a despreader which despreads the equalized signal in response to a predetermined spreading sequence selected from a plurality of sequences corresponding to the plurality of traffic channels.

5. A communication device for receiving a spread spectrum signal which includes a pilot channel and traffic channels, the pilot channel and the traffic channels covered using a Hadamard code before transmission so as to be substantially mutually orthogonal, the communication device comprising:
    a minimum mean-square error (MMSE) equalizer which adapts using the pilot channel, the MMSE equalizer receiving the spread spectrum signal and producing an equalized signal, the MMSE equalizer operable to adapt to minimize a mean square error of the equalized signal, the MMSE equalizer substantially the same for all traffic channels for a given channel condition; and
    a demodulator for demodulating the equalized signal to produce a demodulated traffic channel.

6. A communication device as recited in claim 5 wherein, for transmission of data at high rates, a plurality of traffic channels are assigned to the communication device and wherein the MMSE equalizer is substantially the same for demodulation of all channels by the demodulator.

7. A spread spectrum communication system comprising:
    a plurality of stationary transmitters which transmit respective spread spectrum signals including two or more signals, a first signal being substantially orthogonal to a second signal, wherein each stationary transmitter transmits a pilot channel and substantially orthogonal traffic channels;
    a receiver which receives spread spectrum signals, the receiver including
        an adaptive equalizer which adapts using the first signal, and
        a demodulator for demodulating the second signal; and
    a plurality of mobile receivers including the receiver, the receiver producing an error signal in response to the pilot channel, the adaptive equalizer adapting using the error signal to produce an equalized signal.

8. A spread spectrum communication system as recited in claim 7 wherein each mobile receiver is assigned a predetermined spreading sequence for detecting a traffic channel and wherein the demodulator comprises a despreader for despreading the equalized signal in response to the predetermined spreading sequence.

9. A spread spectrum communication system as recited in claim 8 wherein the receiver further comprises a plurality of adaptive equalizers and an associated plurality of despeaders which are assignable to individual spread spectrum signals transmitted by different transmitters for handing off communication between one transmitter and another transmitter.

10. A receiver for receiving a spread spectrum signal, the spread spectrum signal including a pilot channel and a plurality of traffic channels, all channels being substantially orthogonal, the receiver comprising:
    an adaptive equalizer for receiving the spread spectrum signal and an error signal, the adaptive equalizer suppressing interference on the spread spectrum signal to produce an equalized signal;
    a traffic channel demodulator for demodulating the equalized signal and producing one or more traffic channels;
    a pilot channel demodulator for demodulating the equalized signal to produce a pilot channel estimate; and
    an error signal generator for producing the error signal in response to the pilot channel estimate.

11. A receiver as recited in claim 10 wherein the pilot channel comprises a predetermined data sequence and wherein the error signal generator comprises a comparator which compares the pilot channel estimate and the predetermined data sequence to produce the error signal.

12. A receiver as recited in claim 11 wherein the predetermined data sequence comprises an unchanging sequence of data.

13. A receiver as recited in claim 10 wherein the adaptive equalizer adapts independently of the one or more traffic channels being demodulated.

14. A receiver as recited in claim 13 wherein the adaptive equalizer is substantially the same for each of the plurality of traffic channels for a given channel condition.

15. A receiver as recited in claim 13 wherein the adaptive equalizer adapts using the pilot channel to yield a solution which is independent of the plurality of traffic channels.

16. A communication device for a spread spectrum communication system including a plurality of remote transceivers, the communication device comprising:

a first receiver circuit, including:
  a first adaptive equalizer for receiving first spread spectrum signals from a first base transmitter, suppressing interference and producing a first equalized signal in response to a first error signal,
  a first demodulator for demodulating the first equalized signal to produce traffic signals, and
  a first pilot channel estimator for producing a first pilot channel estimate for the first spread spectrum signals;
a second receiver circuit, including:
  a second adaptive equalizer for receiving second spread spectrum signals from a second base transmitter, suppressing interference and producing a second equalized signal in response to a second error signal,
  a second demodulator for demodulating the second equalized signal to produce traffic signals, and
  a second pilot channel estimator for producing a second pilot channel estimate for the second spread spectrum signals; and
an error signal generator which produces the first error signal and the second error signal in response to the first pilot channel estimate and the second pilot channel estimate.

17. A communication device as recited in claim 16 wherein the error signal generator comprises:
  a combiner for combining the first pilot channel estimate and the second pilot channel estimate to form a combined estimate; and
  a comparator for comparing the combined estimate with a predetermined data sequence and producing the first error signal and the second error signal.

18. A communication device as recited in claim 17 wherein the first error signal and the second error signal are the same error signal.

19. A communication device as recited in claim 16 wherein the error signal generator comprises:
  a first comparator for comparing the first pilot channel estimate with a first predetermined data pattern and producing the first error signal; and
  a second comparator for comparing the second pilot channel estimate with a second predetermined data pattern and producing the second error signal.

20. A method for controlling soft handoff in a spread spectrum communication system, the method comprising the steps of:
  receiving first spread spectrum signals from a first remote transmitter;
  receiving second spread spectrum signals from a second remote transmitter;
  producing an error signal in response to at least one of the first spread spectrum signals and the second spread spectrum signals;
  adaptively equalizing the first spread spectrum signals and the second spread spectrum signals in response to the error signal to produce a first equalized signal and a second equalized signal;
  demodulating a first traffic channel from the first equalized signal;
  demodulating a second traffic channel from the second equalized signal; and
  combining the first traffic channel and the second traffic channel as received data.

21. A method as recited in claim 20 further comprising the steps of:
  detecting a plurality of spread spectrum signals, including the first spread spectrum signals and the second spread spectrum signals, transmitted by respective transceivers;
  selecting the first spread spectrum signals and the second spread spectrum signals as signals for soft handoff; and
  assigning a first adaptive equalizer to the first spread spectrum signal and a second adaptive equalizer to the second spread spectrum signal.

22. A method as recited in claim 21 further comprising the steps of:
  providing a plurality of adaptive equalizers;
  initiating soft handoff with a plurality of sectors greater in number than the plurality of adaptive equalizers;
  selecting sectors having best signal quality and entering soft handoff with those sectors; and
  assigning adaptive equalizers to those sectors.

23. A method as recited in claim 22 wherein the method further comprises the steps of:
  when a signal quality estimate of a sector in soft handoff with no assigned adaptive equalizer exceeds a signal quality estimate of a sector which has been assigned an adaptive equalizer, reassigning the adaptive equalizer to the sector with no assigned adaptive equalizer.

24. A method as recited in claim 20 wherein adaptively equalizing comprises the steps of:
  adapting a first equalizer in response to a first error signal, equalizing the first spread spectrum signals; and
  adapting a second equalizer in response to a second error signal, equalizing the second spread spectrum signals.

25. A method as recited in claim 20 wherein producing an error signal comprises the steps of:
  producing a first pilot signal estimate in response to the first equalized signal and a second pilot signal estimate in response to the second equalized signal;
  combining the first pilot signal estimate and the second pilot signal estimate, producing a combined signal; and
  comparing the combined signal and a predetermined data sequence, producing the error signal.

26. A method for receiving radio frequency (RF) signals at a receiver, the method comprising the steps of:
  in an adaptive equalizer, equalizing the RF signals, producing an equalized signal;
  demodulating the equalized signal, producing demodulated data;
  producing an error signal by comparing a pilot channel of the equalized signal with a predetermined data sequence; and
  adapting the adaptive equalizer in response to the error signal.

27. A method as recited in claim 26 further comprising the steps of:
  producing an estimate of signal to noise ratio (SNR) for the RF signals; and
  scaling the demodulated data in response to the estimate of SNR.

28. A method as recited in claim 27 further comprising the steps of decoding the scaled demodulated data according to a maximum likelihood coding algorithm.

29. A method as recited in claim 26 further comprising the steps of:
  receiving pilot symbols during first time intervals;
  receiving data symbols during second time intervals interspersed with the first time intervals; and adapting the adaptive equalizer only during the first time intervals.

30. A method as recited in claim 29 further comprising the step of providing the demodulated data only during the second time intervals.

31. A method as recited in claim 26 further comprising the steps of:

receiving pilot symbols during first time intervals;

receiving data symbols during second time intervals interspersed with the first time intervals;

adapting the adaptive equalizer during the first time intervals, producing a first equalized signal;

interpolating an interpolated equalizer during the second time intervals using coefficients from the adaptive equalizer, producing a second equalized signal.

32. A method as recited in claim 31 further comprising the steps of:

producing the error signal in response to the first equalized signal; and demodulating the second equalized signal to produce the demodulated data.

33. A method as recited in claim 26 further comprising the steps of:

detecting a pilot channel and one or more synchronization channels of the RF signals; and producing the error signal in response to the pilot channel and the one or more synchronization channels.

* * * * *